Patented Aug. 29, 1939

2,171,491

UNITED STATES PATENT OFFICE 2,171,491

BRAKE AND PRESSURE FLUID

Rudolf Endres, Dessau-Rosslau/Anhalt, Germany

No Drawing. Application July 9, 1937, Serial No. 152,778. In Germany July 30, 1936

6 Claims. (Cl. 252—5)

Fluid mixtures of various compositions for brakes, shock absorbers and driving-gears have already been proposed. An entirely satisfactory fluid has however not yet been found, as the fluids and fluid mixtures known heretofore show in some cases too great viscosity at lower temperatures, e. g. castor-oil, in some cases too great volatility at higher temperatures, e. g. ethylalcohol, acetic ether and acetone, in other cases they attack rubber, e. g. cyclohexanol.

It has now been found that tetrahydrofurfuryl alcohol, which may be obtained by catalytic hydrogenation of furfurol, does not possess the above mentioned disadvantages. Tetrahydrofurfurylalcohol is non-volatile, it shows a low solidifying point, does not attack rubber and is, therefore, excellently adapted for fluid mixtures for brakes, shock absorbers and driving-gears. Materials, with which tetrahydrofurfurylalcohol can be advantageously mixed for the purposes mentioned, include castor-oil, higher molecular aliphatic alcohols, e. g. ricinoleic alcohol and oleic alcohol, cyclic ethers, e. g. acetone-glycerine, cyclohexanone-glycerine or their esters, glycols and their derivatives and the like.

Furane compounds, especially furfurol, are already known as brake fluids. These compounds show however the disadvantage of not being resistant to temperature changes, but resinify and become therefore unsuited for the transmission of pressure. In contrast, tetrahydrofurfurylalcohol, which does not have the typical furane-ring, is stable and does not cause corrosion, especially after an addition of a small quantity of higher molecular alkyl-amines.

The proportions of tetrahydrofurfurylalcohol in brake and pressure fluid mixtures may vary within wide limits. Suitable mixtures are e. g.:

(1) 50 parts by weight of castor-oil and 50 parts by weight of tetrahydrofurfurylalcohol,
(2) 50 parts by weight of ricinoleyl alcohol and 50 parts by weight of tetrahydrofurfurylalcohol,
(3) 25 parts by weight of oleic alcohol and 75 parts by weight of tetrahydrofurfurylalcohol,
(4) 50–75 parts by weight of cyclo-hexanone-glycerine and 25–50 parts by weight of tetrahydrofurfurylalcohol.

I claim:

1. Brake and pressure fluids consisting of tetrahydrofurfuryl alcohol in mixture with material of the group consisting of primary aliphatic unsaturated alcohol having 18 carbon atoms in the molecule, and cyclohexanone-glycerin.

2. Brake and pressure fluid consisting of 50 parts by weight of ricinoleyl alcohol and 50 parts by weight of tetrahydrofurfurylalcohol.

3. Brake and pressure fluid consisting of 50–75 parts by weight of cyclo-hexanone-glycerine and 25–50 parts by weight of tetrahydrofurfurylalcohol.

4. Brake and pressure fluid consisting of 25 to 50 parts by weight of primary aliphatic unsaturated alcohol having 18 carbon atoms in the molecule and 50 to 75 parts by weight of tetrahydrofurfurylalcohol.

5. Brake and pressure fluids as defined in claim 1 containing in addition a small proportion of high molecular alkyl amine.

6. Brake and pressure fluids as defined in claim 3 containing in addition a small proportion of high molecular alkyl amine.

RUDOLF ENDRES.